Figure 4:
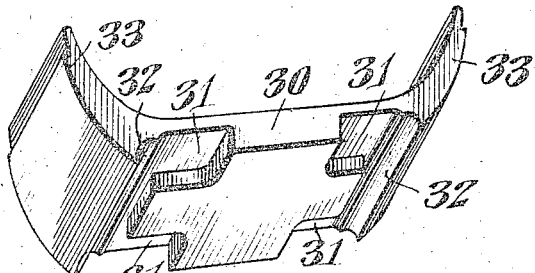

H. A. GAMBLE.
TIRE ARMOR.
APPLICATION FILED JAN. 28, 1909.
966,438.
Patented Aug. 9, 1910.
2 SHEETS—SHEET 1.
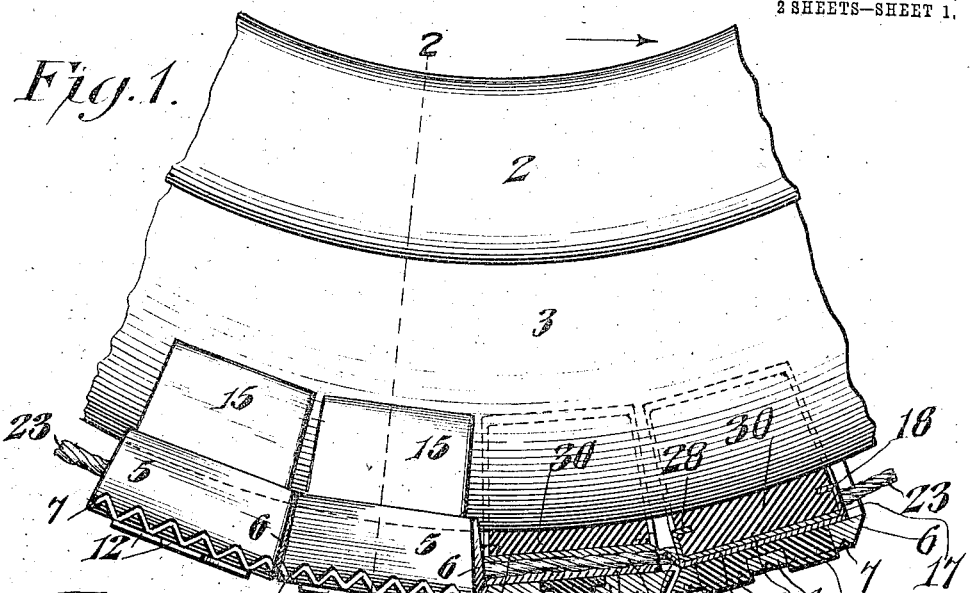
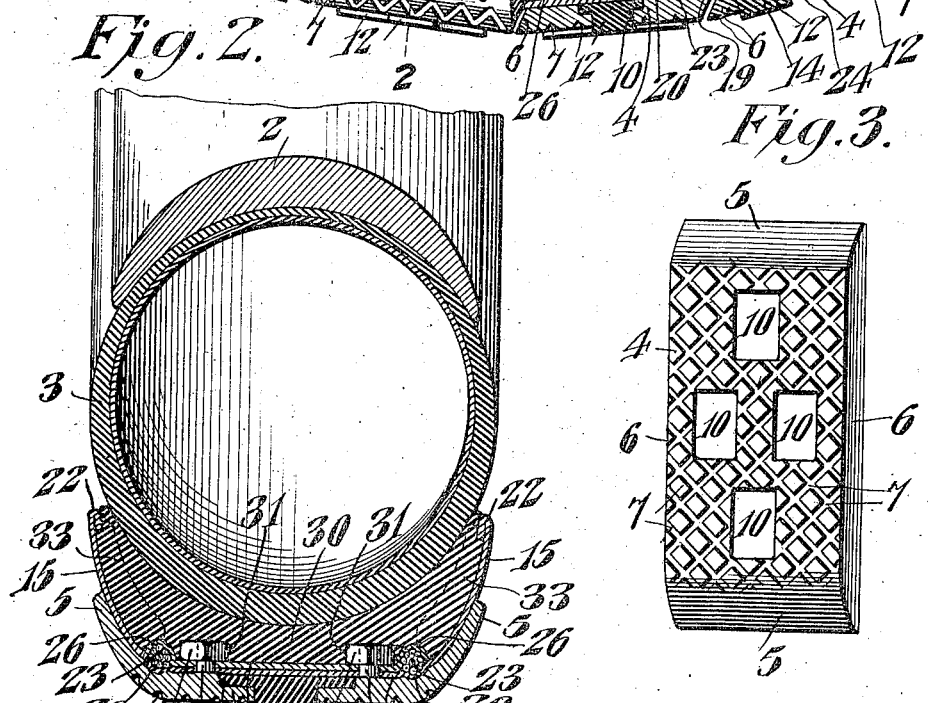
Henry A. Gamble, Inventor

H. A. GAMBLE.
TIRE ARMOR.
APPLICATION FILED JAN. 28, 1909.

966,438.

Patented Aug. 9, 1910.
2 SHEETS—SHEET 2.

Witnesses
Jas. K. McCathran
Frederic B. Wright

Henry A. Gamble Inventor
By
C. G. Siggers
Attorney

UNITED STATES PATENT OFFICE.

HENRY ARTHUR GAMBLE, OF SAN FRANCISCO, CALIFORNIA, ASSIGNOR OF ONE-FOURTH TO JOHN HAROLD MURCH, JR., OF SAN FRANCISCO, CALIFORNIA.

TIRE-ARMOR.

966,438.

Specification of Letters Patent. Patented Aug. 9, 1910.

Application filed January 28, 1909. Serial No. 474,680.

*To all whom it may concern:*

Be it known that I, HENRY A. GAMBLE, a citizen of the United States, residing at San Francisco, in the county of San Francisco and State of California, have invented a new and useful Tire-Armor, of which the following is a specification.

My invention relates to flexible armor for pneumatic tires, and particularly to armor which is composed of a plurality of metallic segments adapted to be attached to the tire and to protect the same from injury.

My invention consists broadly in the use of a plurality of armored segments, preferably of metal, held together by a flexible connection common to all segments, each segment making a flexible joint with the next adjacent segments, these joints between the segments being so protected as largely to prevent the introduction of mud or stones between the segments.

The invention also consists in the use with armor of the character described of a flexible endless cable which holds the segments together, and in this connection the invention consists in the combination with a tread shoe and flexible connection referred to, of clamping plates forming housings receiving the cables, these housings being corrugated to prevent any creeping movements of the segments upon the cables.

In addition, the invention further consists in providing a tire-contacting block of yielding material, such as rubber, on the inside of each of the segments, the yielding nature of this block in connection with the yielding tire, acting to prevent creeping of the segments around the tire—a fault quite common in constructions of this character.

The object of my invention is to provide an armor which will perfectly protect a pneumatic tire, which will not be detachable from the tire so long as it is in an inflated condition, but which may be readily detached when the tire is deflated, and, further to provide a tire armor formed with segments so connected to each other that each segment is to a certain extent independently movable and may change its angular relation to the adjacent segment; in which air is allowed to enter between the segments, and to contact with the tire, thus preserving the life of the pneumatic tire; in which the segments overlap so that mud, dirt, and stones may not be forced up into the space between the segments, and in which the metallic portions of the segments do not contact with each other and clash as the wheel turns.

Figure 5:
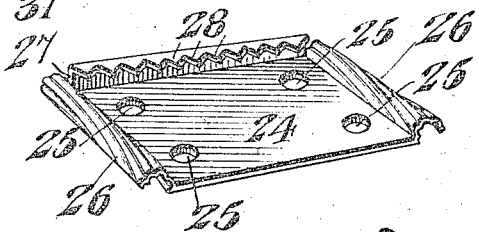
Figure 6:
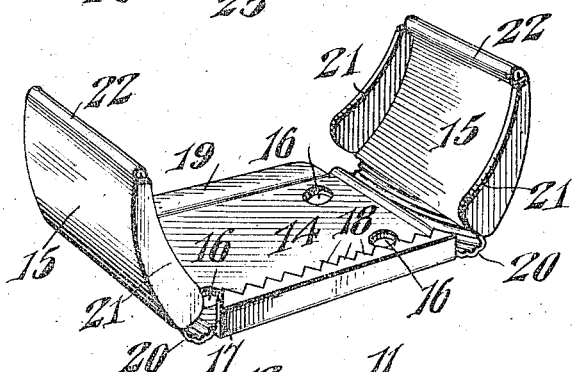
Figure 7:
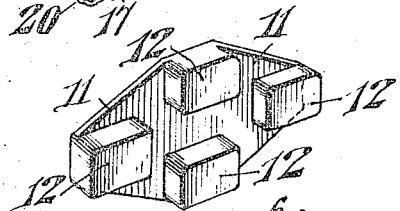
Figure 8:
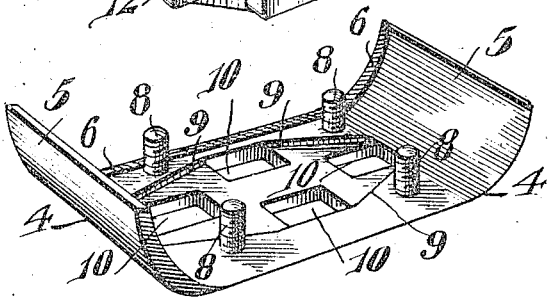

In the drawings, Figure 1 is a side elevation of a portion of a pneumatic tire with my improved armor applied thereto; two of the segments of the armor being shown in section; Fig. 2 is a transverse section on the line 2—2 of Fig. 1; Fig. 3 is an external view of the tread plate; Fig. 4 is a perspective view of the tire contacting block; Fig. 5 is a perspective view of the upper clamping plate; Fig. 6 is a perspective view of the lower clamping plate; Fig. 7 is a perspective view of the plate carrying the rubber tread studs; and Fig. 8 is a perspective view of the tread shoe plate.

In the drawings, 2 denotes a rim of any ordinary construction, and 3 a pneumatic tire thereon.

4 denotes a tread shoe having the upwardly and outwardly curved ends 5, and the oppositely beveled side edges 6. It will be seen from Fig. 1 that these side edges on each tread shoe 4 are substantially parallel to each other, and that thus the beveled edge of one tread shoe overlaps the beveled edge of the next adjacent tread shoe, though the tread shoes do not contact. The outer surface of the tread shoe is preferably corrugated as at 7, or otherwise formed so as to take hold of the road. The interior of the shoe is provided with the inwardly projecting studs 8, screw-threaded for the reception of nuts, as will be later described. The inside face of the tread shoe is recessed as at 9, the recess preferably having the general form of a diamond. Openings, 10, extend from the face of this recess to the exterior of the shoe, these openings in the drawing being shown as four in number, and they are adapted to receive four plugs or studs, 12, of rubber, preferably projecting from a backing 11 of rubber, which is adapted to be received within the recess 9. As shown in Fig. 1 these studs 12 are slightly longer than the thickness of the tread shoe and project through the same so as to afford a means whereby the tread shoe will take firm hold of the ground, and yet have yielding contact therewith.

While I have shown four openings, 10, each having a quadrilateral shape, I do not wish to be limited in this regard, nor to the arrangement of these openings, nor to the diamond shape of the recess 9.

In order to hold the studs 12 in place and provide them with a rigid backing and, at the same time, for the engagement of the segment-connecting cables, I provide the plate 14, adapted to rest within the straight portion of the shoe 4 and having the upwardly inclined end portions 15 corresponding to the end portions 5, but extending considerably above these end portions and partially embracing the tire 3, as shown in Fig. 2. The plate 14 is provided with four stud openings, 16, through which the studs 8 pass. One edge of the plate 14 is formed with the upwardly projecting flange 17, having at its upper end the inwardly turned teeth, 18, while the other side edge of the plate 14 is provided with the extended flange 19, which, while extending beyond the edge of the plate 14, is slightly inclined thereto, acting to partly close the joint between the two segments, as shown in Fig. 1, in the space between the cables. At the junction of the end portions 15 with the plate 14, semi-circular cable housings, 20, are formed which extend transversely across the plate 14. It will be understood that the plate 14, the cable housings, and the end plates 15 are formed all in one piece. These cable housings are preferably corrugated with spiral ribs so as to conform to the contour of the attaching cables. The end portions 15 are each provided with the inwardly projecting side flanges, 21, and, at their outer ends with a bead, 22, these flanges, 21, and the beads 22 acting to hold in place a tire-contacting block of yielding material, to be later described.

The housings, 20, are adapted to receive parallel cables, 23, of wire rope, the ends of these cables being spliced so as to form an endless cable on each side of the tire as shown in Fig. 2.

The segments are held in position upon the cables by a clamping plate 24, shown in Fig. 5. This consists of a plate of the same size as the plate 14, and having the stud openings 25 formed therethrough for the passage of the studs 8. The plate is formed at its opposite ends with the semi-circular housings, 26, of the same character as the housings, 20, but reversed therefrom, of course. These housings are also spirally corrugated to conform to the surface of the cable. The plate 14, as stated hereinbefore, is formed at one edge with the upwardly-projecting flange, 17, and the inwardly projecting teeth, 18, and the clamp plate 24 has also an upwardly-projecting flange 27 having the teeth 28, this flange, with its teeth, being on the side opposite the flange, 17, and the teeth, 18, when the plate 24 is in position upon the plate 14, the teeth being provided for the purpose of gripping the side edges of a tire-contacting yielding block, 30, shown in Fig. 4.

In assembling the segments upon the cable, 23, the plates 11 are first inserted each into its recess, 9, with the plugs 12 extending through the openings, 10. The plate 14 is then placed upon the interior face of the tread plate with the studs 8 projecting therethrough. The plates are then put in engagement with the cables, 23, so that the cables shall fit within the channels formed by the corrugated housings, 20. The clamp plate 24 is then placed upon the inner face of the plate 14, the studs 8 projecting therethrough and the housings, 26, closing down on the cables contained within the housings, 20, and thus completing the housings 20 and entirely inclosing the cable. Nuts 29, as shown in Fig. 2 are then placed upon the studs 8 and screwed down until the plates 14 and 24 are clamped securely against the inside of the shoe and until the plate 24 is clamped against the plate 14, thus rigidly holding the segment in its place upon the cable 23.

The block 30 shown in Fig. 4 is of yielding material and preferably rubber. It is cut away on its under face as at 31 to form recesses to accommodate the nuts 29, and is also transversely cut away as at 32, to fit over the outer faces of the housings, 26. The block 30 is further provided with the opposed outwardly and upwardly curved ends 33 of a width adapted to be received between the flanges 21, the ends of the wings 33 contacting with the beads 22. The inwardly-turned teeth 28 and 18 engage with the side edges of the block 30 and hold the block rigidly in position. The contact of the block 30 with the yielding rubber face of the pneumatic tire creates such frictional engagement between the two, that the segments as a whole, will not creep upon the tire, while, of course, the clamping action between the plates 14 and 24 prevents any longitudinal movement of the segments upon the cables, 23.

In order to put the armor in place upon the tire, the tire is deflated, whereupon it may be readily inserted within the circle of armor segments, and thus by inflating the tire, it will be expanded against said circle of segments, and the segments be held firmly engaged therewith.

In order to detach the armor, it is only necessary to deflate the tire, and in order to detach any one of the segments it is only necessary to remove the block 30, which may be done with comparative ease, and then screw the nuts 29, when, of course, the plate 24 may be taken off, which will permit the plate 14 and the plates 5 to be slipped from engagement with the housing and to be entirely removed. By this means the rubber plugs 12, with their backing 11, may be easily replaced or repaired at any time.

The advantages of my invention are as follows: I provide a tire armor comprising a series of metallic segments, which, while flexibly engaged with each other so that the armor may conform to the tire and to inequalities in the road, yet provides a protection which entirely prevents puncture, which takes off wear from the pneumatic tire and which also provides for a ventilation of the pneumatic tire. Because of the block 30, the metal of the armor is prevented from contacting directly with the pneumatic tire, and a frictional engagement is created which prevents all creeping. In addition to this function of the rubber block, 30, it will be seen that the flexible yielding material of which it is composed causes it to conform more closely to the exterior configuration of the pneumatic tire than would be possible were the block not used and the metal of the shoe itself contacted with the tire.

The cables whereby the segments are held together are sufficiently flexible, relatively cheap, very strong and require no lubrication, as would be the case were the connection made by means of links. The cable housings are corrugated to prevent slipping of the shoes on the cables which engage the corrugations. The rubber plugs 12 which project through the tread shoe receive all jar, and under ordinary circumstances slightly elevate the metallic plate above the road-bed, hence reducing the wear of this metallic plate, rendering the contacts between the plate and the road noiseless and giving a firm grip upon the road.

Attention is also called to the importance of the fact that the tread shoes 4 do not contact with each other, though they overlap, and that the blocks 30 do not contact with each other, but that the space between the blocks is shielded by the flange 19. Thus air may pass between the shoes and between the blocks and so come into contact with the tire 3. This is particularly necessary in pneumatic tires for the reason that the rubber therein very quickly rots or disintegrates where it has no ventilation, and besides, unless provision of this character were made, water would be liable to be retained between the inner faces of the segments and the pneumatic tire, thus also tending to disintegrate the material. By reason, too, of the separation of the segments there is no contact between the metallic parts thereof. This is important, as it is conducive to quietness in running. If there were contact the metallic portions would strike each other every time the tire flexed and a constant clicking noise or clatter would result. This is the reason that many tire armors are of no practical value.

It will also be seen particularly from Fig. 2 that there is no contact between the metallic portions of the armor and the rubber tire, and that the tire being held rigidly in the armor when running, will flex and reflex inwardly of the armor or above the upper edge thereof.

As is shown in Fig. 1, the forwardly-inclined edge 6 of the shoe extends reversely to the movement of rotation, as shown by the arrow, and thus these inclined ends of the segments will not pick up stones or gravel as they might do had they a reverse inclination relatively to the direction of the wheel's rotation. While, because of the small scale of the drawings, I have shown the outer faces of the segments as flat, in practice they will be slightly curved from front to rear to correspond to the curvature of the circumference of the wheel.

Having thus described my invention, what I claim as new and desire to secure by Letters-Patent, is:

1. In a tire armor, the combination of a plurality of sections, with flexible endless connecting elements holding the sections together in coöperative relation, each section consisting of a tread plate, a compressible block under the tread plate formed with a convex inner face for bearing on the tire, a device interposed between the block and tread plate and separately secured to both, and means on the device for receiving the said endless elements.

2. In a tire armor, the combination of a tread plate, a compressible block disposed under the plate and shaped to fit the outer face of a tire, a device interposed between the plate and block, bolts for securing the plate to the device, and members on the device for securing the block thereto, said device serving as a common connection between the block and plate.

3. In a tire armor, the combination of a tread plate, a block disposed under the same and shaped to bear on the outer face of the tire, a sheet metal connecting element between the block and plate, said element having integral members gripping into the block, and fastenings for securing the plate to the said element.

4. In a tire armor composed of sections, each section consisting of a tread plate, a block disposed under the tread plate and shaped to fit the outer face of a tire, a connecting device to which the plate and block are separately fastened, and flexible elements connected solely with the said device for securing adjacent sections of the armor together, said device serving to secure the block and plate in fixed relation to each other and for fastening them to the flexible elements.

5. In a tire armor composed of a plurality of sections, each section consisting of a tread plate, a cushioning block under the same, a connecting device disposed between the plate and block, flexible elements extending between the block and plate for connecting adjacent sections of the armor together, means on the device for connecting the same with the elements, and separate means for securing the plate and block to the connecting device.

6. In a tire armor, the combination of a tread plate, a cushion block disposed under the same and shaped to fit the outer face of a tire, flexible elements passing between the block and plate, a connecting device composed of two parts having portions clamped to the flexible elements, means on the device for gripping the block, and fastenings for securing the plate to the connecting device and for holding the parts of the latter clamped to the elements.

7. A flexible armor for pneumatic tires comprising a series of independent segments shaped to conform to the contour of the tire to be embraced thereby, parallel channels formed in opposite portions of the segments, endless parallel cables of twisted wire carried in said channels, locking plates detachably connected to the segments and having portions fitting over said channels and the contained cable, said channels being spirally corrugated to conform to the configuration of the cables and prevent relative creeping between the cables and segments.

8. A flexible armor for pneumatic tires comprising a series of independent segments shaped to conform to the contour of the tire to be embraced thereby, said segments having spirally corrugated parallel channels formed therein, in combination with endless bands of intertwisted spirally arranged wires fitting in the corrugations of the channels for holding the segments circumferentially.

9. A flexible armor for pneumatic tires composed of sections each section consisting of a tread segment formed with parallel channels, a device extending over the segment and having pressed-out channel portions arranged to seat in the channels of the segment, endless flexible connections disposed parallel and passing through the channeled portions of the said device, and means for clamping the device and segment together and to the said connections for preventing slipping of the segment thereon.

10. In a tire armor, the combination of a tread plate, a cushion block disposed under the same and shaped to fit a tire, a device disposed between the plate and block for securing the same together and composed of two parts having complementary channels, flexible elements passing through the channels, and fastenings for securing the plate to the device and for clamping the parts of the latter to the elements.

11. In a tire armor, the combination of an outer tread member, an inner cushion block, a pair of plates interposed between the block and member and having registering channels and registering openings adjacent the channels, flexible elements passing through the channels, and fastenings passing through the said openings for securing the member to the plates and for clamping the latter to the flexible elements.

12. In a tire armor, the combination of an outer tread member, an inner cushion block, a pair of plates interposed between the block and member and having registering channels and registering openings adjacent the channels, flexible elements passing through the channels, fastenings passing through the said openings for securing the member to the plates and for clamping the latter to the flexible elements, and members on the plates embedded in opposite sides of the block for securing the latter in place.

13. In a tire armor, the combination of a tread member, a pair of plates arranged under the same and having opposed channels, flexible elements passing through the channels, fastening devices for securing the plates together and to the tread member and for clamping the plates to the elements, a cushion block arranged on the plates and engaging the said fastenings for preventing loosening thereof, and hook-shaped flanges on the plates embedded in the block to retain the same in place.

14. The combination with a tread plate for pneumatic tire armor having openings from its inside face to its tread face and provided with inwardly projecting screw-threaded studs on its inner face, of a yielding plate having studs projecting outwardly through the openings in the tread plate, and a plate locked over the yielding plate and the inner face of the tread plate having openings through which the screw threaded studs project, and nuts on the studs holding said locking plate firmly engaged with the inner face of the tread plate.

15. In a tire armor, the combination of a tread member, a cushion block under the same, a pair of plates interposed between the block and member and one having channels at its ends and the other at points intermediate its ends to register with the first-mentioned channels, flexible elements passing through the channels, means for clamping the plates together for gripping the elements, and devices on the plates for engaging the block.

16. In a tire armor, the combination of a tread member having a relatively flat central portion and laterally bent ends, a block disposed under the member and shaped to fit a tire, a plate bearing on the inner face of the member and having a central portion and angularly-disposed end portions connected with the central portion by channels, the edges of the plate being formed into flanges for engaging the sides of the block, a second plate having its ends formed into channels disposed opposite the channels of the first plate, flexible elements passing through the channels, and fastenings for clamping the plates to the elements and securing the said member to the plates.

17. In a tire armor, the combination of a cushsioning block, a sheet metal structure disposed over the outer face of the block and having spaced parallel channels and side and end flanges for engaging the sides and ends of the block, the portions of the side flanges between the channels being embedded in the block, and flexible elements passing through the channels.

18. In a tire armor, the combination of a cushioning block shaped to fit the outer face of a tire, a supporting structure for the block consisting of a central section and angularly disposed end sections, said end sections having side and end flanges for engaging the terminal portions of the block, said central portion having means for gripping the central portion of the block, and a tread member secured to the said structure.

19. A segmental shoe for pneumatic tire armor comprising a tread plate having upwardly extending ends, a plate located upon the inner face of said tread plate having upwardly-extending ends projecting on either side beyond the ends of the tread plate and having inwardly-projecting flanges, and a block of yielding material co-extensive with the second plate and retained within said flanges with its entire inner face in contact with the outer face of a tire.

20. A segmental shoe for pneumatic tires comprising a tread plate having upwardly-turned end portions and inwardly projecting studs, a plate retained on the inner face of the tread plate by said studs and having upwardly projecting ends, flexible connections, said plate being formed with parallel channels adapted to receive said flexible connections, a locking plate engaging over the last-named plate and adapted to close said channels and lock over said flexible connections, and a block of yielding material carried between the upwardly extending ends of said second-named plate having a concaved face adapted to contact with a tire.

21. A flexible armor for pneumatic tires comprising a series of independent segments, each segment consisting of a tread plate having upwardly and outwardly extending ends and provided with inwardly extending studs on the inner face of the tread plate, a locking plate formed with parallel channels semi-circular in cross section, a complementary locking plate located on the inner face of the first-named locking plate, held in place by said studs and also having channels semi-circular in cross section and alining with the first-named channels, a block of yielding material retained between the upwardly-extending ends of the locking plate and having a concaved inner surface to engage with a tire, and parallel endless cables threaded through the channels of each of the segments and locked between the two locking plates thereof.

22. A flexible armor for pneumatic tires, each comprising a series of independent segments flexibly connected to each other, each segment consisting of a tread plate having outwardly and upwardly-turned ends, a locking plate mounted on the inner face of each of the tread plates and having outwardly and upwardly-projecting ends, said locking plate being provided with flanges having inwardly projecting teeth, in combination with a block of yielding material supported on said locking plate and engaged by the teeth, said block having a concaved inner face contacting with the pneumatic tire.

23. A flexible armor for pneumatic tires, the same comprising a series of independent segments flexibly connected to each other, each segment consisting of a tread plate, studs projecting from the inner surface of the tread plate and complementary locking plates retained on the inner face of the tread plate by said studs, said locking plates having flanges on their edges provided with inwardly-projecting teeth, and one of said plates being formed with outwardly-extending end portions having inwardly-extending flanges, in combination with a block of yielding material engaged by said teeth and held between the flanges of the end portions, said block having a concaved inner face adapted to contact with a tire.

24. A flexible armor for pneumatic tires comprising a series of independent segments, each segment including a tread plate having upwardly-extending flanges and studs projecting from the inner face of the plate, a locking plate having upwardly-projecting flanges and openings through which said studs pass, said locking plate having one edge flange thereof formed with inwardly-projecting teeth, an additional locking plate provided with openings for the passage of the studs and adapted to be retained on the inner face of the first-named locking plate and having on its edge an upwardly projecting flange provided with inwardly-projecting teeth, parallel flexible endless cables threaded through said locking plates and engaged thereby to hold the segments in position, nuts engaging the studs on the inner face of the innermost locking plate, and a block of yielding resilient material having recesses for the accommodation of said nuts and located between the flanges of the locking plates and engaged by the teeth thereof, said block having an internally concaved face adapted to contact with the convex face of a tire.

25. In a tire armor, a cushioning block having a concave under side to fit transversely over the tire, the outer face of the block having transverse parallel channels and recesses adjacent the channels.

26. In a tire armor, a tread member comprising a plate having an approximately flat central portion and laterally turned ends, said central portion being recessed in its inner face and having apertures extending through the recessed portion, and integral studs extending inwardly from the central portion, the longitudinal edges of the plate being oppositely beveled in substantially parallel planes.

27. A flexible armor for pneumatic tires comprising a series of independent segments, each segment including a tread plate having its opposite side edges beveled in parallel planes, a two-part locking plate bolted to the interior of the tread plate and having extended end portions adapted to partially embrace a tire, endless parallel flexible connections engaged between the two parts of the locking plate, one of said portions of the locking plate being provided with a projecting flange extending over the edge of the next succeeding tread plate and covering the space therebetween, and a block carried by said locking plate having its inner surface concaved to conform to a pneumatic tire.

28. In a tire armor, the combination of a plurality of sections and flexible elements connecting the sections together, each section consisting of a tread plate having opposite edges arranged in overlapping relation to the tread plates of adjacent sections, a compressible block arranged under the tread plate and shaped to fit the tire, a connecting device composed of separable parts between which the flexible elements pass and said device having means for attaching the block thereto, and fastenings for clamping the parts of the device together on the flexible elements for holding the tread plate in non-contacting relation with the tread plates of adjacent sections and for preventing slipping of the segment on the elements.

In testimony, that I claim the foregoing as my own, I have hereto affixed my signature in the presence of two witnesses.

HENRY ARTHUR GAMBLE.

Witnesses:
W. B. FLOYD,
EUGENE WEET.